United States Patent [19]

Lindemann

[11] 4,180,776
[45] Dec. 25, 1979

[54] AUTOMATIC CHANNEL SCANNING ATTACHMENT FOR MANUAL CB RADIO TRANSCEIVER

[76] Inventor: Philip J. Lindemann, P.O. Box 1665, Omak, Wash. 98841

[21] Appl. No.: 900,413

[22] Filed: Apr. 27, 1978

[51] Int. Cl.$^2$ ............................................. H04B 1/40
[52] U.S. Cl. ..................................... 325/25; 325/470; 325/471
[58] Field of Search ............... 325/469, 470, 471, 303, 325/353, 355, 356, 15, 16, 464, 458, 25, 35, 478; 343/175

[56] References Cited

U.S. PATENT DOCUMENTS

| Re. 27,329 | 4/1972 | Mayle | 178/5.8 R |
|---|---|---|---|
| 2,537,944 | 1/1951 | Colgan | 250/20 |
| 2,639,373 | 5/1953 | Goodrich | 250/20 |
| 3,290,602 | 12/1966 | Hayden | 325/393 |
| 3,447,088 | 5/1969 | Guyton et al. | 325/458 |
| 3,614,621 | 10/1971 | Chapman | 325/334 |
| 3,715,495 | 2/1973 | Takezaki et al. | 178/5.8 A |
| 3,821,651 | 6/1974 | Fathauer et al. | 325/470 |
| 3,873,924 | 3/1975 | Fathauer | 325/470 |
| 3,916,093 | 10/1975 | Parker | 178/5.8 A |
| 3,947,774 | 3/1976 | Glemneur | 325/670 |
| 3,961,261 | 1/1976 | Pelasterer | 325/335 |
| 4,112,377 | 9/1978 | Tanner et al. | 325/461 |

*Primary Examiner*—Robert L. Richardson
*Assistant Examiner*—Peter Durigon
*Attorney, Agent, or Firm*—Wells, St. John & Roberts

[57] ABSTRACT

An automatic channel scanning attachment is described for connecting to a CB radio transceiver having a manual channel selection. The attachment is designed to automatically manipulate the manual channel selector to scan the channel to select an active channel. The attachment includes a separate chassis having a wire for connecting to the transceiver squelch circuit to receive a squelch signal. The attachment includes a signal polarity network for producing a process signal of a desired polarity in response to a squelch signal of an unknown polarity. The process signal activates a scanning control network to generate a scanning signal that may be time delayed with respect to the squelch signal. The scanning signal is used to activate a selector actuator means to manipulate the manual channel selector to scan the channels until an active channel is found.

6 Claims, 5 Drawing Figures

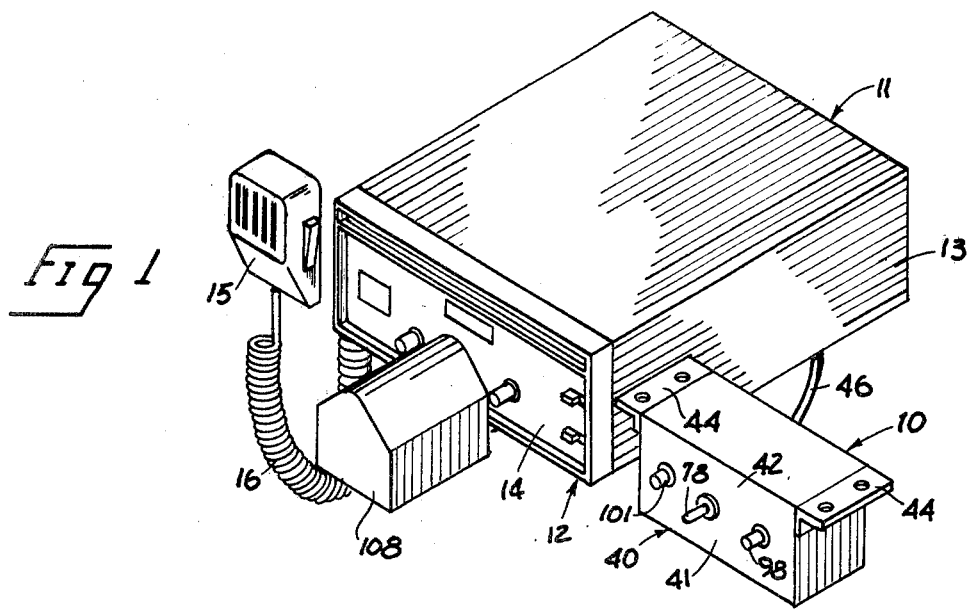
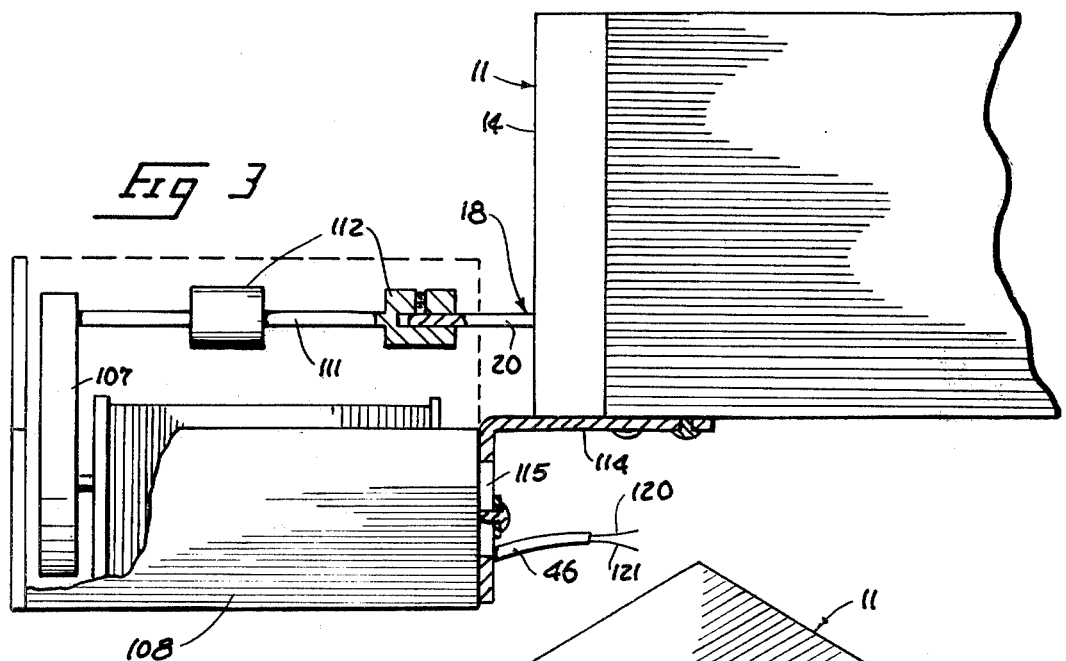
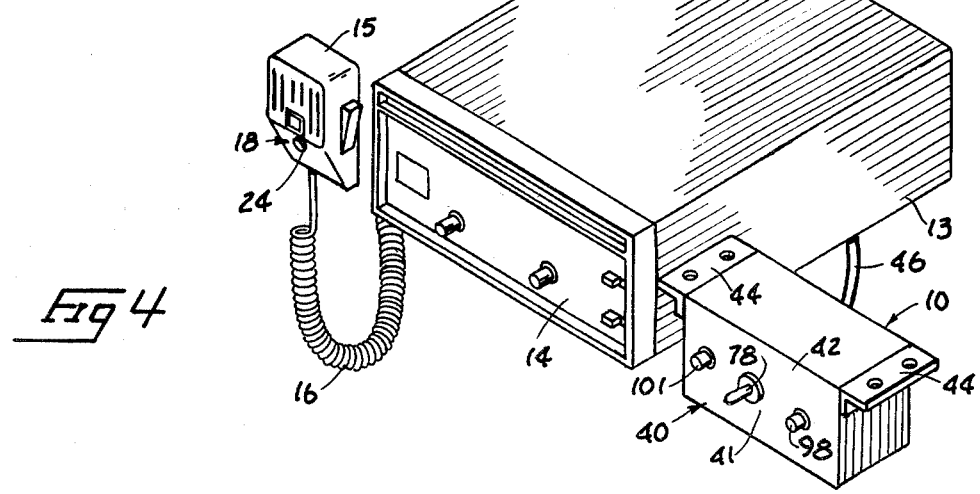

AUTOMATIC CHANNEL SCANNING ATTACHMENT FOR MANUAL CB RADIO TRANSCEIVER

BACKGROUND OF THE INVENTION

This invention relates to CB radio transceivers and more specifically to automatic channel scanning attachments for CB radio transceivers that have manual channel selectors.

The purpose of this invention is to provide an inexpensive automatic channel scanning attachment that may be easily attached to a CB radio transceiver that has a manual channel selector to enable the combination to automatically scan the CB frequencies and tune the transceiver to an active channel. It is particularly advantageous while driving an automobile to be able to automatically scan CB channels without having to manipulate the manual channel selector by hand. Manual manipulation may distract the driver's attention and cause a dangerous condition.

A further object of this invention is to provide an automatic channel scanning attachment that has several embodiments that are adaptable to a manual channel selector of the knob type or of the push-button type.

These and other objects and advantages of this invention have become apparent upon reading the following detailed description of a preferred embodiment.

BRIEF DESCRIPTION OF THE DRAWINGS

Preferred and alternate embodiments are illustrated in the accompanying drawings, in which:

FIG. 1 is an isometric view of a CB transceiver having a manual knob channel selector with a preferred embodiment of the invention attached thereto for enabling the transceiver with the attachment to automatically scan CB frequency channels and tune the transceiver to an active channel;

FIG. 3 is a vertical cross-sectional view taken through a motor assembly unit of the attachment illustrated in FIG. 1;

FIG. 4 is an isometric view of a CB transceiver having push-button manual channel selector with an alternate embodiment of the attachment.

DETAILED DESCRIPTION OF A PREFERRED AND ALTERNATE EMBODIMENT

Figure 2:
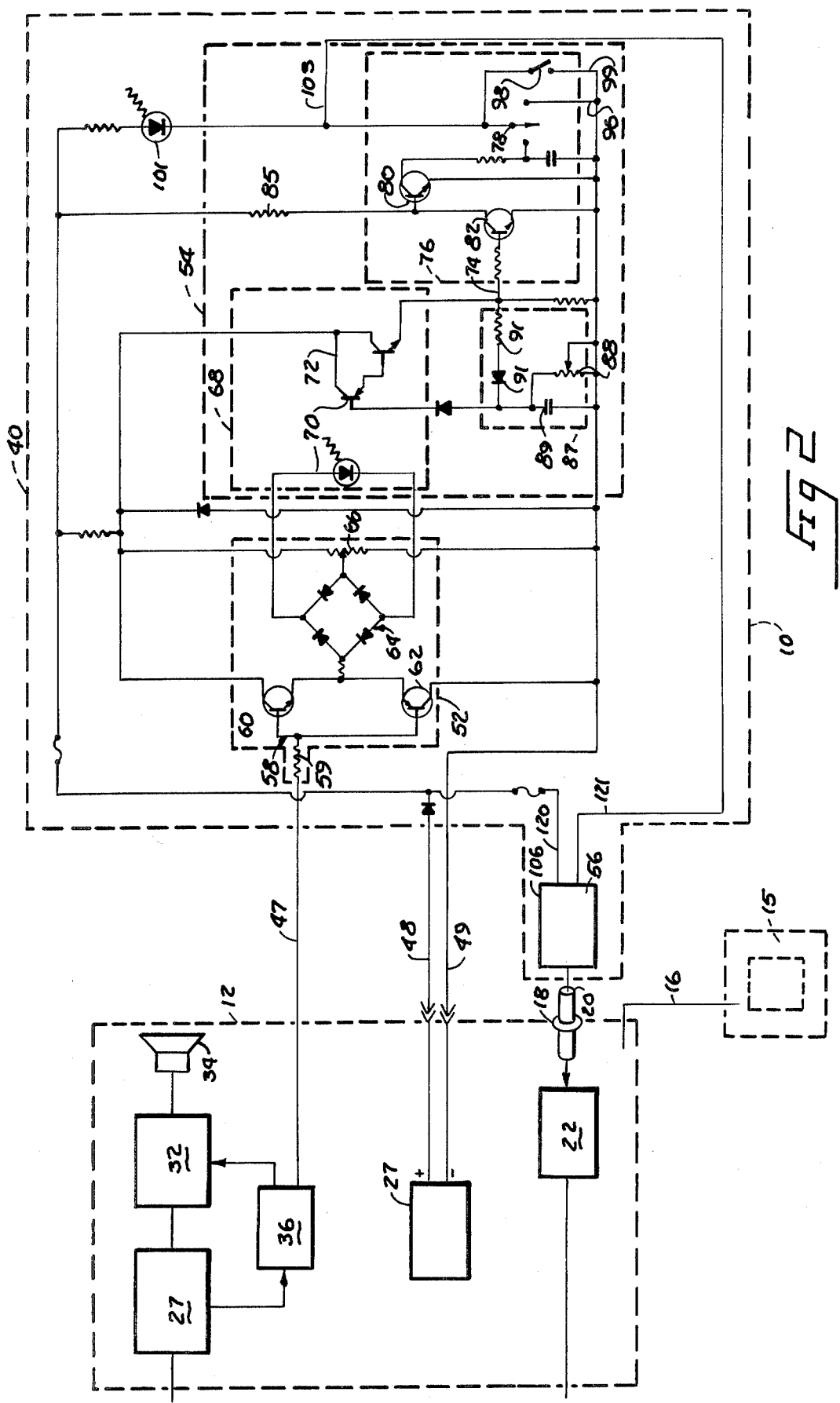
FIG. 2 is an electrical schematic view of the embodiment illustrated in FIG. 1.

Turning now in detail to the drawings, there is illustrated in FIG. 1 an automatic channel scanning attachment generally designated with the numeral 10 for attaching to a CB radio transceiver generally designated with the numeral 11. The CB radio transceiver includes a chassis 12 enclosed by a housing or case 13. The case 13 has a front control panel 14.

The transceiver 11 has a hand-held microphone assembly 15 with a flexible cable that extends from the microphone assembly 15 to the housing 13. Generally, the hand-held microphone assembly 15 includes a push-to-talk button that is depressed to enable the operator to transmit. The flexible cable 16 generally has a jack on one end that is plugged into an appropriate receptacle of the chassis 12.

The CB radio transceiver includes a manual channel selector generally designated with the numeral 18. In the embodiment illustrated in FIG. 1 the manual channel selector 18 is of the knob-dial type having a knob shaft 20 that projects outward through the control panel 14. The shaft 20 generally has a knob mounted thereon for enabling the operator to rotate the shaft 20 to manipulate the tuning circuits 22 (FIG. 2) to change or tune the transceiver to a desired channel. In the alternate embodiment illustrated in FIG. 4, the manual channel selector 18 includes a push button 24 mounted on the microphone assembly 15 (FIG. 4) or on the control panel 14 (not shown) that indexes the tuning circuit 22 electronically to the desired channel.

The automatic channel scanning attachment 10 in the preferred embodiment (FIGS. 1-3) is designed to attach to a transceiver 11 having a projecting knob shaft 20 whereas in the alternate embodiment (FIGS. 4 and 5) the attachment is designed to accommodate a transceiver 11 having an indexing push-button 24 either on the control panel 14 or on the microphone assembly 15.

The CB radio transceiver 11 has internal electronics that are partially illustrated in FIGS. 2 and 4. The transceiver 11 has a DC voltage system 27 that regulates a DC voltage in the neighborhood of 12 VDC.

Generally, the transceiver 11 includes a detector circuit 30 that is operatively connected to the tuning circuits 22 for detecting the presence of a tuned signal that is fed to an audio amplifier 32. The audio amplifier 32 is connected to a speaker 34 for generating audible sounds that are intelligible to the operator. The transceiver 11 includes a squelch circuit 36 that is operatively connected between the detector 30 and the audio amplifier 32 for deactivating the audio amplifier 32 when the transceiver is not tuned to an active channel. The squelch circuit 36 is designed to generate a squelch signal for deactivating the audio amplifier 32 and thereby reduce static noise when the transceiver is not tuned to an active channel.

The automatic channel scanning attachment 10 is designed to utilize the squelch signal as an input signal to the attachment 10. The attachment is designed to manipulate the normally manual scanning CB radio transceiver 11 to be able to automatically scan the channels and seek an active channel.

The automatic channel scanning attachment 10 includes an electronic chassis 40 enclosed by a housing 41. Housing 41 has a front control panel 42. Side brackets 44 are provided to mount the housing 41 to a desired location such as to the dashboard of an automobile.

An electrical cable 46 extends from the electronic chassis 40 for connection to the transceiver 11. The electrical cable preferably includes a squelch signal input wire 47 and voltage DC power wires 48 and 49. The input wire 47 is designed to attach electrically to the squelch circuit 36 of the transceiver 11 to transmit the squelch signal from the transceiver 11 to the attachment 10. The wires 48 and 49 are designed to connect with a convenient DC power source such as system 27 to provide power to the attachment.

Figure 5:
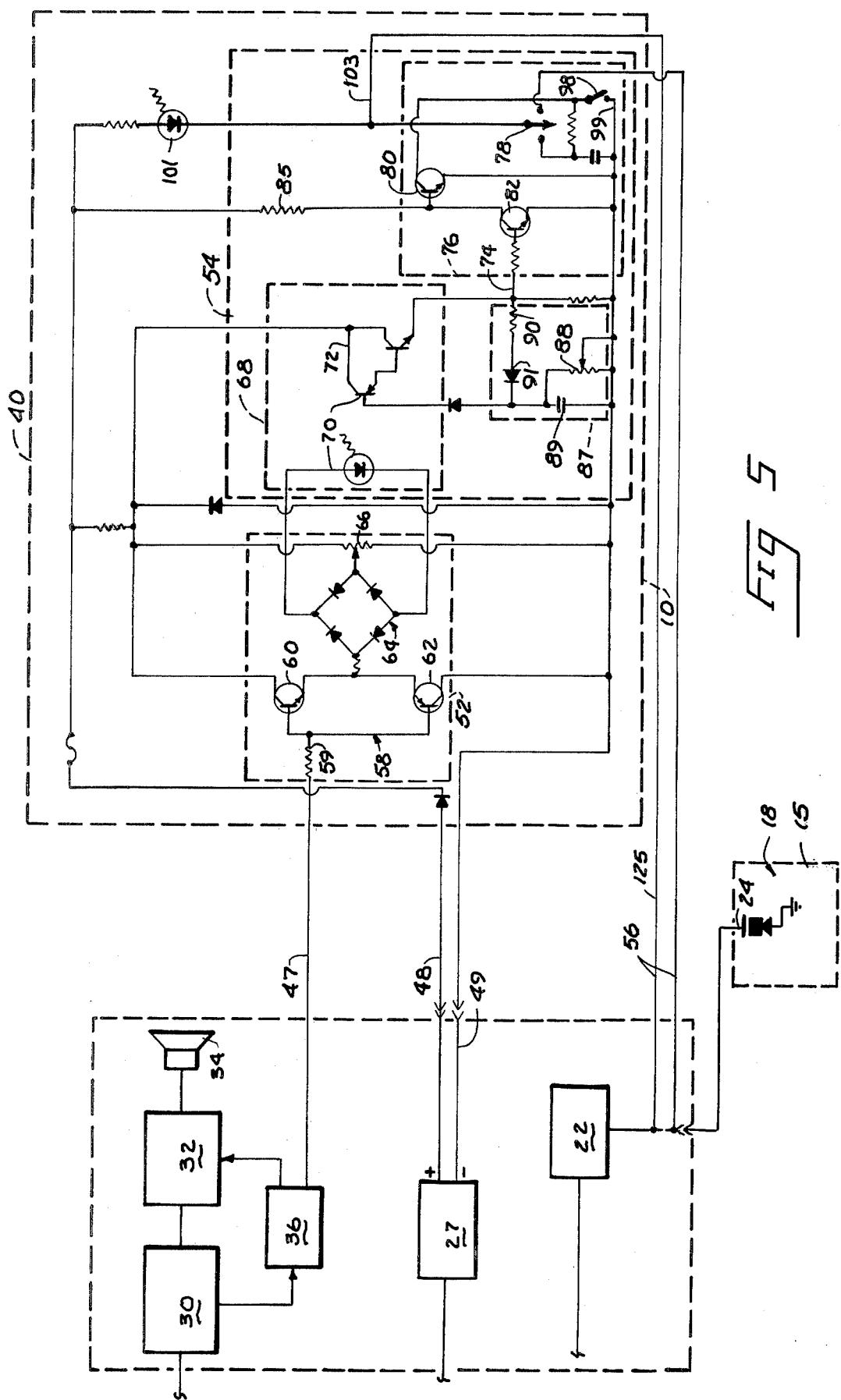
FIG. 5 is an electrical schematic view of the alternate embodiment illustrated in FIG. 4.

The attachment 10 as illustrated in FIGS. 2 and 5 includes a signal polarity network 52 for receiving the squelch signal and processing the squelch signal to activate a scanning control network generally designated with the numeral 54. Scanning control network 54 generates a channel scanning signal that in turn is utilized to activate a channel selector actuating means 56. The channel selector activating 56 is operatively connectable to the manual channel selector 18 of the transceiver 11 to cause the manual channel selector 18 to be automatically manipulated to scan the CB channels in response to the generation of a squelch signal.

The signal polarity network 52 includes an input current amplifier circuit 58 with an input resister 59 that is operatively connected to the wire 47 to isolate and prevent excessive stray capacitance from being processed. The current amplifier 58 preferably takes the form of a pair of emitter transistors 60 and 62 that are mounted back to back. The amplifier 58 has the advantage of providing a high input impedance and a high current output to the next stage. The signal polarity network 52 further includes a diode-rectifier circuit 64 that is electrically connected to the current amplifier 58 for providing an output signal that has a desired polarity independently of the polarity of the incoming squelch signal. A balancing resister 66 is part of the rectifier circuit 64 and is designed to be adjusted so as to have a low output from the rectifier circuit 64 while the squelch signal is being applied on the input wire 47. The output of rectifier circuit 64 is designed to be high when the squelch signal is not being received. The output from the signal polarity network 52 may be referred to as an amplified and rectified squelch signal which is in turn applied to the scanning control network 54.

The scanning control network 54 includes an isolating amplifier circuit 68 that includes an optical coupler 70 that generates optical radiation to activate a Darlington amplifier circuit 72. When the squelch signal is generated the optical coupler 70 is turned off and when the squelch signal is not being received the optical coupler 70 is turned on. The Darlington amplifier 72, when turned on, generates a process signal on an output line 74 which is connected to a switching circuit 76. Switching circuit 76 includes a manually operated control switch 78 that is mounted on the attachment control panel 42. Switch 78 may be manually manipulated between a scan-mode position, an off-mode position and a manual-mode position. When the control switch 78 is placed in the scan mode, voltage is applied to the collector of a switching transistor 80. The base of the transistor 80 is connected to the collector portion of a transistor 82. The base of the transistor 82 is connected to the output lines 74 of the isolating amplifier circuit 68. When the output of the Darlington amplifier 72 is low or turned off, transistor 82 is likewise turned off causing transistor 80 to turn on. The base of the transistor 80 is fed through resistor 85 to normally maintain the resistor 80 on and thereby creating a ground signal for the channel selector actuating means 56. The creation of the ground path through transistor 80 may be referred to as the generation of a channel scanning signal.

When the transceiver 11 is tuned to an active channel, the squelch signal is discontinued causing the optical amplifier 70 to radiate turning on the Darlington amplifier 72 and producing a process signal on the output line 74. The process signal on the output line 74 turns on the transistor 82. When transistor 82 is turned on, it becomes saturated and the voltage from collector to emitter drops to a very low level which turns transistor 80 off, removing the ground path and thereby extinguishing the channel scanning signal to the channel selector actuating means 56.

The scanning control network 54 further includes a time delay circuit 87 that receives the output from the Darlington amplifier 72. The time delay circuit 87 includes a variable resistor 88 for controlling the discharging of capacitor 89. A protective resistor 90 and a diode 91 are provided in the time delay circuit 87 for biasing the Darlington amplifier 72. Consequently, when the squelch signal is initially received, the optical coupler 70 is turned off. However, the time delay circuit 87 provides current to the base of the Darlington amplifier 72 to maintain the Darlington amplifier 72 on for a short period of time until the capacitor 89 is discharged. After the capacitor 80 is discharged, the Darlington amplifier 72 is turned off causing the transistor 82 to turn off and transistor 80 to on and thereby initiate scanning. Consequently, the time delay circuit 87 delays the scanning operation for a desired period of time even though the transceiver 11 is tuned to a channel that may be temporarily inactive. Such a feature provides for a desired delay of time after receipt of the squelch signal before the channel scanning signal is generated by the scanning control network 54.

The switch circuit 76 further includes a manual-mode line 96 that is directed to ground parallel with transistor 80. When the control switch 78 is positioned to manual-mode, the channel scanning signal will automatically be generated so that the operator may cause the manipulation of the manual channel selector 18 from the control panel 42 even though the squelch signal is not generated. Furthermore, the switch circuit 76 has an override push button 98 on panel 42 to provide a parallel ground path 99 to cause scanning when the push button 98 is depressed to initiate scanning even though the control switch 78 is in the scan mode position and a squelch signal has not been received. Such a feature is desirable to move to another channel even though the previous channel was active.

A luminating device 101 such as a light illuminating diode (LED) is provided in the scanning control network 54 that is illuminated during the scanning operation. The scanning control network 54 includes an output line 103 on which the channel scanning signal is transmitted to the channel selector actuating means 56.

The channel selector actuating means 56 in the preferred embodiment, illustrated in FIGS. 1–3, includes a DC motor circuit 106 that is mounted in a housing 108. The DC motor circuit drives a motor through a gear train 107 to rotate an output shaft 111. The output shaft 111 is adapted to connect to the shaft 20 of the manual channel selector 18 through a coupling 112. The motor housing 108 may be mounted by a bracket 114 directly to the housing 13. The bracket 114 has vertical adjustment apertures 115 to enable the output shaft 111 to be axially aligned with the shaft 20. When the DC motor circuit 106 received the channel scanning signal on output line 103, the DC voltage is applied across the motor to cause the motor to rotate the shaft 20 and move or cause the tuning circuits 22 to be adjusted until the scanning signal is terminated. When the scanning signal is terminated, the motor discontinues rotation of the output shaft 111 to keep the manual channel selector 18 on the selected channel. Wires 120 and 121 extend from the chassis 40 to the motor circuit 106. Preferably the wires 120 and 121 are included in the electrical cable 46.

In the alternate embodiment of FIGS. 4 and 5, the attachment 10 is designed to complement a transceiver 11 having a pushbutton type manual channel selector 18. In such a configuration, the tuning circuit 22 generally includes solid state devices preferably a solid state integrated circuit in which the push-button (of an up-down variety) signals the integrated circuit to step from one channel to the adjacent channel in either direction.

As shown in FIGS. 4–5, the push button 24 is positioned on the microphone assembly 15. Alternatively the push button 24 may be positioned on the transceiver control panel 14. In either case, the channel selector actuating means 56 includes a wire 125 extending from chassis 40 to chassis 12. One end of wire 125 is electrically connected to the input to the tuning circuit 22 and the other end is electrically connected to output line 103 to apply a signal to the integrated circuit to step the integrated circuit from one channel to the next while the channel scanning signal is being generated (when transistor 80 is on).

It should be understood that the above described embodiments are merely illustrative of the principles of this invention and other embodiments may be devised without deviating therefrom to define or limit this invention.

What I claim is:

1. A universal automatic channel scanning attachment for a wide variety of manual channel selector CB radio transceivers adapted to be responsive to squelch circuits that produce squelch signals of positive or negative polarity when the transceivers are not tuned to active channels to enable each transceiver with an attachment to automatically scan the CB frequency channels and tune the transceiver in an active channel; said attachment comprising:

a chassis separated from the CB radio transceiver;
   an input electrical wire mounted to the chassis and adapted for extending to the CB radio transceiver and electrically connecting to the transceiver squelch circuit to transmit the squelch signal to the chassis;
   a signal polarity network mounted to the chassis and electrically coupled to the input electrical wire for generating a process signal in response to the receipt of the positive or negative squelch signal;
   a scanning control network mounted in the chassis and electrically coupled to the signal polarity network for generating a channel scanning signal in response to the squelch signal; and
   channel selector actuating means electrically coupled to the scanning control network and adapted to be operatively connected to the manual channel selector of the CB radio transceiver for actuating the manual channel selector to automatically scan the CB channels when the channel scanning signal is generated.

2. The automatic channel scanning attachment as defined in claim 1 wherein the scanning control network includes an electrically isolating amplifier circuit that is operatively connected to the input electrical wire for activating the generation of the channel scanning signal in response to the squelch signal and for preventing stray signals that may be produced in the attachment from being transmitted to the squelch circuit of the CB radio transceiver.

3. The automatic channel scanning attachment as defined in claim 1 wherein the scanning control network includes a switching circuit for generating the channel scanning signal.

4. The automatic channel scanning attachment as defined in claim 1 wherein the scanning control network includes a time delay circuit for delaying the generation of the channel scanning signal for a selected time period after the initial receipt of the squelch signal to delay the automatic scanning of the channels until a previously active channel has been inactive for the selected time period.

5. The automatic channel scanning attachment as defined in claim 1 wherein the manual channel selector includes a rotatable selector shaft that projects from a control panel of the transceiver and wherein the channel selector actuating means includes a motor drive means that is adaptable for interconnecting with the selector shaft for rotating the selector shaft in response to the generation of the channel scanning signal to scan the CB channels.

6. The automatic channel scanning attachment as defined in claim 1 wherein the manual channel selector includes an indexing pushbutton for applying a signal to tuning circuits to change channels and wherein channel selector actuating means includes a wire that is adapted for direct connection to the tuning circuits for applying a similar signal to the tuning circuits to scan the channels when the channel scanning signal is generated.

* * * * *